(12) United States Patent
Dunham

(10) Patent No.: US 6,601,402 B2
(45) Date of Patent: Aug. 5, 2003

(54) ENTHALPY WHEEL

(75) Inventor: Ryan Dunham, Fultonville, NY (US)

(73) Assignee: Plug Power Inc., Latham, NY (US)

( * ) Notice: Subject to any disclaimer, the term of this patent is extended or adjusted under 35 U.S.C. 154(b) by 0 days.

(21) Appl. No.: 09/999,682

(22) Filed: Oct. 31, 2001

(65) Prior Publication Data

US 2002/0050145 A1 May 2, 2002

Related U.S. Application Data

(60) Provisional application No. 60/244,525, filed on Oct. 31, 2000.

(51) Int. Cl.[7] .......................... F25D 23/00; B01D 53/06
(52) U.S. Cl. .............................. 62/271; 165/10; 96/150; 429/26
(58) Field of Search .................... 62/271, 90; 165/8, 165/95, 16, 7, 10; 427/13, 17, 26, 34, 38; 96/150, 153, 121, 125

(56) References Cited

U.S. PATENT DOCUMENTS 3,667,642 A * 6/1972 Blau et al. .................. 220/288
3,741,353 A * 6/1973 McKinley et al. .......... 188/171

* cited by examiner

*Primary Examiner*—Chen Wen Jiang
(74) *Attorney, Agent, or Firm*—Fish & Richardson P.C.

(57) ABSTRACT

This invention relates to enthalpy wheels and systems containing enthalpy wheels. The enthalpy wheel subasssembly includes a first plate, a cap, a compliance element between the first plate and the cap and a pressure producing element between the fist plate and the cap.

16 Claims, 7 Drawing Sheets

ENTHALPY WHEEL

CROSS-REFERENCE TO RELATED APPLICATION

This application claims priority under 35 U.S.C. §119(e)(1) to U.S. Provisional Patent Application Ser. No. 60/244,525, filed on Oct. 31, 2000, and entitled "Enthalpy Wheel," the entire contents of which are hereby incorporated by reference.

TECHNICAL FIELD

The invention relates to enthalpy wheels and systems containing enthalpy wheels.

BACKGROUND

A fuel cell can convert chemical energy to electrical energy by promoting a chemical reaction between two gases.

One type of fuel cell includes a cathode flow field plate, an anode flow field plate, a membrane electrode assembly disposed between the cathode flow field plate and the anode flow field plate, and two gas diffusion layers disposed between the cathode flow field plate and the anode flow field plate. A fuel cell can also include one or more coolant flow field plates disposed adjacent the exterior of the anode flow field plate and/or the exterior of the cathode flow field plate.

Each flow field plate has an inlet region, an outlet region and open-faced channels connecting the inlet region to the outlet region and providing a way for distributing the gases to the membrane electrode assembly.

The membrane electrode assembly usually includes a solid electrolyte (e.g., a proton exchange membrane, commonly abbreviated as a PEM) between a first catalyst and a second catalyst. One gas diffusion layer is between the first catalyst and the anode flow field plate, and the other gas diffusion layer is between the second catalyst and the cathode flow field plate.

During operation of the fuel cell, one of the gases (the anode gas) enters the anode flow field plate at the inlet region of the anode flow field plate and flows through the channels of the anode flow field plate toward the outlet region of the anode flow field plate. The other gas (the cathode gas) enters the cathode flow field plate at the inlet region of the cathode flow field plate and flows through the channels of the cathode flow field plate toward the cathode flow field plate outlet region.

As the anode gas flows through the channels of the anode flow field plate, the anode gas passes through the anode gas diffusion layer and interacts with the anode catalyst. Similarly, as the cathode gas flows through the channels of the cathode flow field plate, the cathode gas passes through the cathode gas diffusion layer and interacts with the cathode catalyst.

The anode catalyst interacts with the anode gas to catalyze the conversion of the anode gas to reaction intermediates. The reaction intermediates include ions and electrons. The cathode catalyst interacts with the cathode gas and the reaction intermediates to catalyze the conversion of the cathode gas to the chemical product of the fuel cell reaction.

The chemical product of the fuel cell reaction flows through a gas diffusion layer to the channels of a flow field plate (e.g., the cathode flow field plate). The chemical product then flows along the channels of the flow field plate toward the outlet region of the flow field plate.

The electrolyte provides a barrier to the flow of the electrons and gases from one side of the membrane electrode assembly to the other side of the membrane electrode assembly. However, the electrolyte allows ionic reaction intermediates to flow from the anode side of the membrane electrode assembly to the cathode side of the membrane electrode assembly.

Therefore, the ionic reaction intermediates can flow from the anode side of the membrane electrode assembly to the cathode side of the membrane electrode assembly without exiting the fuel cell. In contrast, the electrons flow from the anode side of the membrane electrode assembly to the cathode side of the membrane electrode assembly by electrically connecting an external load between the anode flow field plate and the cathode flow field plate. The external load allows the electrons to flow from the anode side of the membrane electrode assembly, through the anode flow field plate, through the load and to the cathode flow field plate.

Electrons are formed at the anode side of the membrane electrode assembly, indicating that the anode gas undergoes oxidation during the fuel cell reaction. Electrons are consumed at the cathode side of the membrane electrode assembly, indicating that the cathode gas undergoes reduction during the fuel cell reaction.

For example, when hydrogen and oxygen are the gases used in a fuel cell, the hydrogen flows through the anode flow field plate and undergoes oxidation. The oxygen flows through the cathode flow field plate and undergoes reduction. The specific reactions that occur in the fuel cell are represented in equations 1–3.

$$H_2 \rightarrow 2H^+ + 2e^- \qquad (1)$$
$$\tfrac{1}{2}O_2 + 2H^+ + 2e^- \rightarrow H_2O \qquad (2)$$
$$H_2 + \tfrac{1}{2}O_2 \rightarrow H_2O \qquad (3)$$

As shown in equation 1, the hydrogen forms protons ($H^+$) and electrons. The protons flow through the electrolyte to the cathode side of the membrane electrode assembly, and the electrons flow from the anode side of the membrane electrode assembly to the cathode side of the membrane electrode assembly through the external load. As shown in equation 2, the electrons and protons react with the oxygen to form water. Equation 3 shows the overall fuel cell reaction.

In addition to forming chemical products, the fuel cell reaction produces heat. One or more coolant flow field plates are typically used to conduct the heat away from the fuel cell and prevent it from overheating.

Each coolant flow field plate has an inlet region, an outlet region and channels that provide fluid communication between the coolant flow field plate inlet region and the coolant flow field plate outlet region. A coolant (e.g., liquid de-ionized water or other low conductivity fluids) at a relatively low temperature enters the coolant flow field plate at the inlet region, flows through the channels of the coolant flow field plate toward the outlet region of the coolant flow field plate, and exits the coolant flow field plate at the outlet region of the coolant flow field plate. As the coolant flows through the channels of the coolant flow field plate, the coolant absorbs heat formed in the fuel cell. When the coolant exits the coolant flow field plate, the heat absorbed by the coolant is removed from the fuel cell.

To increase the electrical energy available, a plurality of fuel cells can be arranged in series to form a fuel cell stack. In a fuel cell stack, one side of a flow field plate functions as the anode flow field plate for one fuel cell while the opposite side of the flow field plate functions as the cathode flow field plate in another fuel cell. This arrangement may be referred to as a bipolar plate. The stack may also include monopolar plates such as, for example, an anode coolant flow field plate having one side that serves as an anode flow field plate and another side that serves as a coolant flow field plate. As an example, the open-faced coolant channels of an anode coolant flow field plate and a cathode coolant flow field plate may be mated to form collective coolant channels to cool the adjacent flow field plates forming fuel cells.

In some fuel cell systems, an enthalpy wheel is used to transfer energy and/or water from one gas stream to another, such as from an anode gas outlet stream to a cathode gas inlet stream. This can improve the efficiency of the fuel cell system by reducing the amount of water and/or energy that is added to the system during operation.

SUMMARY

The invention relates to enthalpy wheels and systems containing enthalpy wheels.

In certain embodiments, the enthalpy wheels are designed so that a relatively constant pressure is applied to the rotor within the enthalpy wheel as the temperature of the enthalpy wheel varies from room temperature to the operating temperature of the enthalpy wheel. This can reduce the variation in the torque required to rotate the wheel during operation.

In some embodiments, the enthalpy wheels are designed so that a relatively low torque is used to rotate the enthalpy wheel during use. This can reduce the amount of energy that is input into a fuel cell system containing the enthalpy wheel during use of the fuel cell system, thereby increasing the overall efficiency of the fuel cell system.

In one aspect the invention features an enthalpy wheel subassembly that includes a first plate, a cap, a compliance element between the first plate and the cap and a pressure producing element between the first plate and the cap. The pressure producing element being different from the compliance element. In some embodiments, the enthalpy wheel subassembly is included in an enthalpy wheel, which, in turn, can be included in a fuel cell system, such as a PEM fuel cell system.

In another aspect, the invention features an enthalpy wheel subassembly that includes an enthalpy wheel subassembly housing having a first end and a second end, a plate at the first end of the enthalpy wheel subassembly, a cap at the second end of the enthalpy wheel subassembly, a compliance element between the first plate and the cap and a pressure producing element between the first plate and the cap, the pressure producing element being different from the compliance element. In some embodiments, the enthalpy wheel subassembly is included in an enthalpy wheel, which, in turn, can be included in a fuel cell system, such as a PEM fuel cell system.

The enthalpy wheel subassembly can include one or more of the following features.

The compliance element can be partially or completely formed of foam.

The pressure producing element can be one or more springs.

The enthalpy wheel subassembly can further include a second plate between the first plate and the cap. The compliance element can be between the first and second plates. The pressure producing element can be between the second plate and the cap.

In certain embodiments, the invention features methods of operating one or more of the preceding enthalpy wheels or a fuel cell system (e.g., a fuel cell system containing PEM fuel cells) to generate water and power (e.g., electricity).

Other features, aspects and advantages of the invention will be apparent from the description, the drawings and the claims.

DETAILED DESCRIPTION

Figure 1:
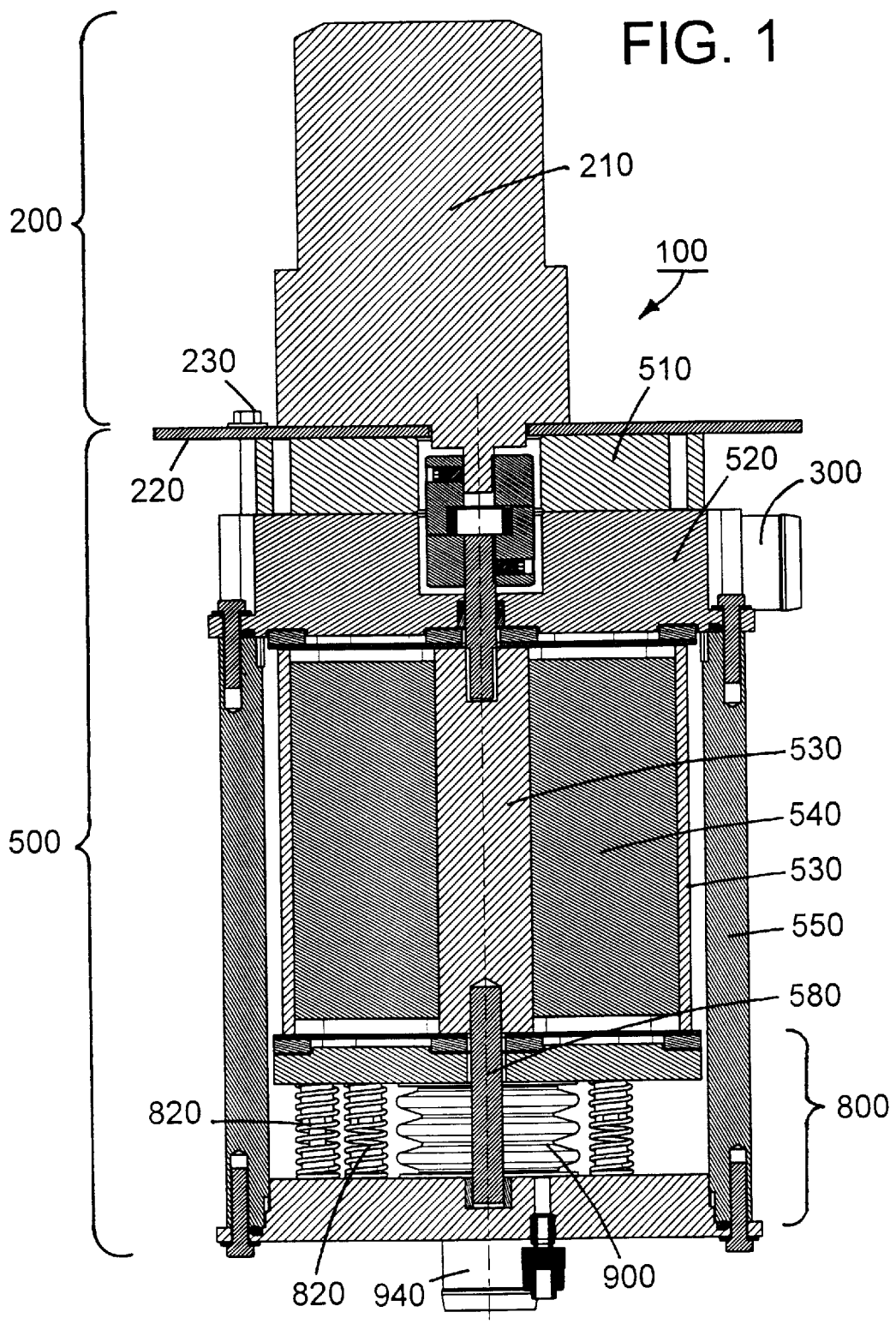
FIG. 1 is a cross-sectional view of an enthalpy wheel.
Figure 2:
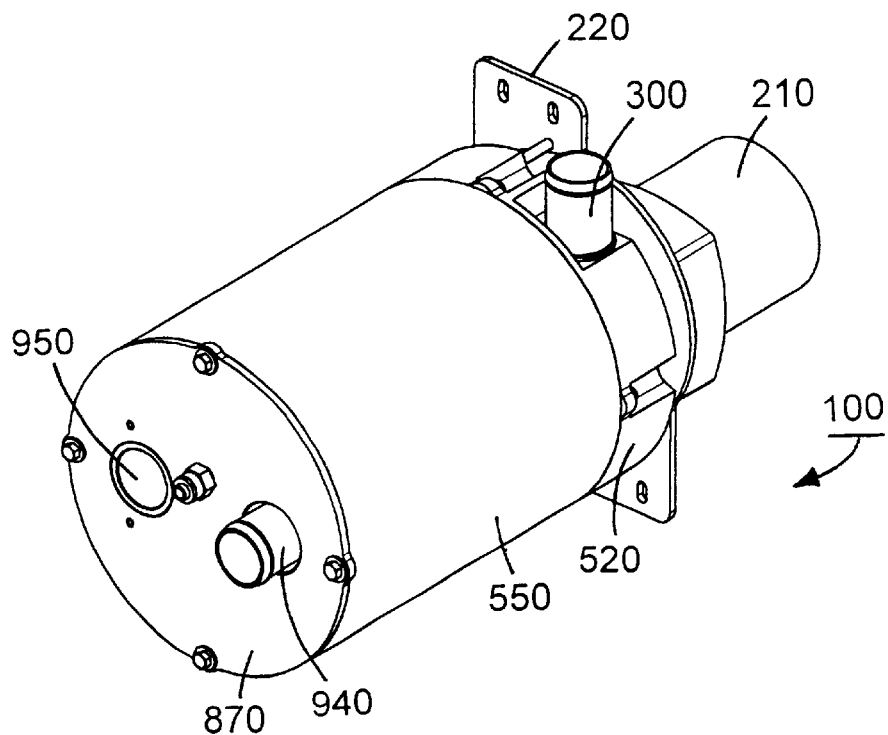
FIG. 2 is a perspective view of an enthalpy wheel.
Figure 3:
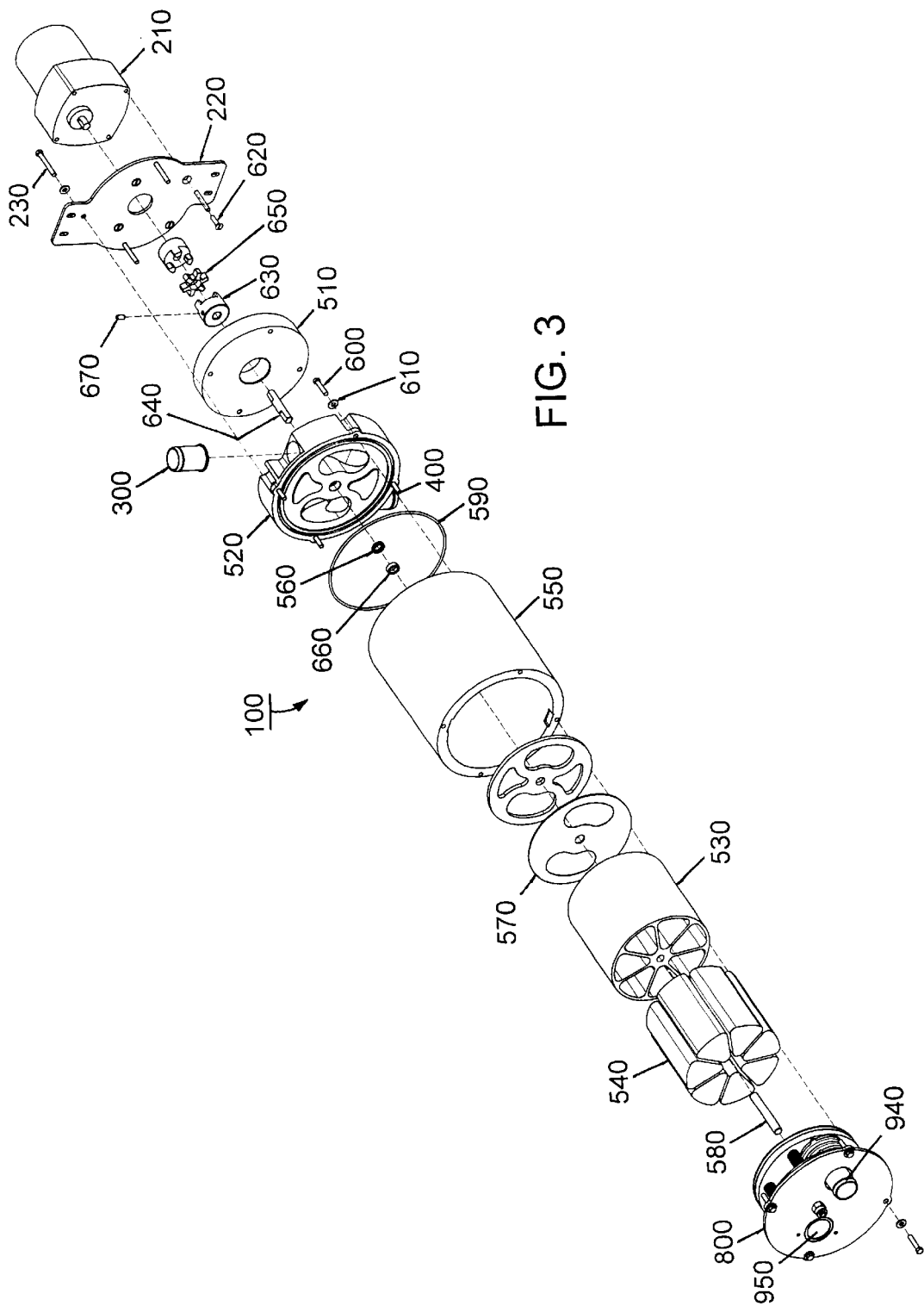
FIG. 3 is an exploded view of an enthalpy wheel.

The invention relates to enthalpy wheels and systems containing enthalpy wheels. FIG. 1 shows a cross-sectional view of an enthalpy wheel 100 including a motor unit 200, a tube 300, a tube 400, a housing unit 500 and a subassembly 800. FIGS. 2 and 3 show perspective and exploded views, respectively, of enthalpy wheel 100. Motor unit 200 includes a motor 210, a mounting bracket 220 and a cap screw 230. Housing unit 500 includes a spacer 510, a cap 520, a rotor 530, a dessicant material 540, a housing 550, a seal 560 (e.g., a Teflon® seal), a plate 570, a shaft 580 (e.g., a floating end shaft) an O-ring 590, a cap screw 600, a washer 610 (e.g., a flat washer), a screw 620 (e.g., a machine screw), a hub 630 (e.g,. a lovejoy coupling hub), a shaft 640 (e.g., a fixed end shaft), a spider 650 (e.g., a lovejoy coupling spider), a sleeve bearing 660, a screw 670 (e.g., a coupling set screw) and a subassembly 800. Screw 620, hub 630, spider 650 and screw 670 form a coupling between motor 210 and rotor 530.

Figure 4:
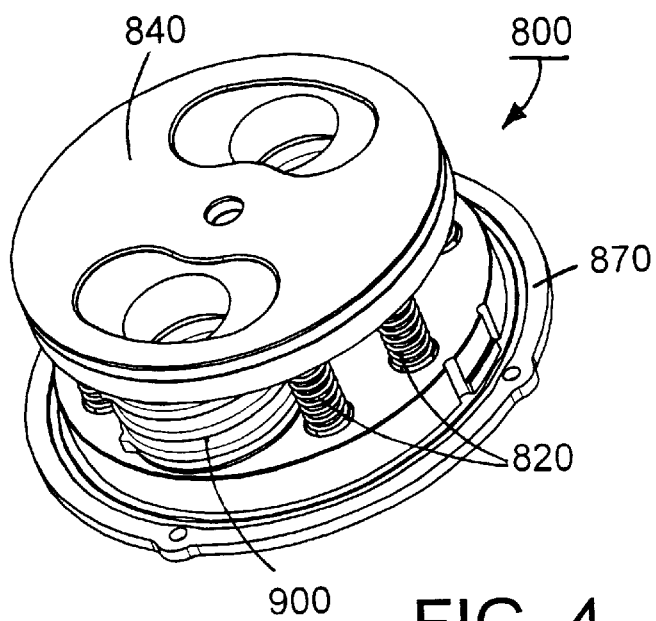
FIG. 4 is a perspective view of an enthalpy wheel subassembly.
Figure 5:
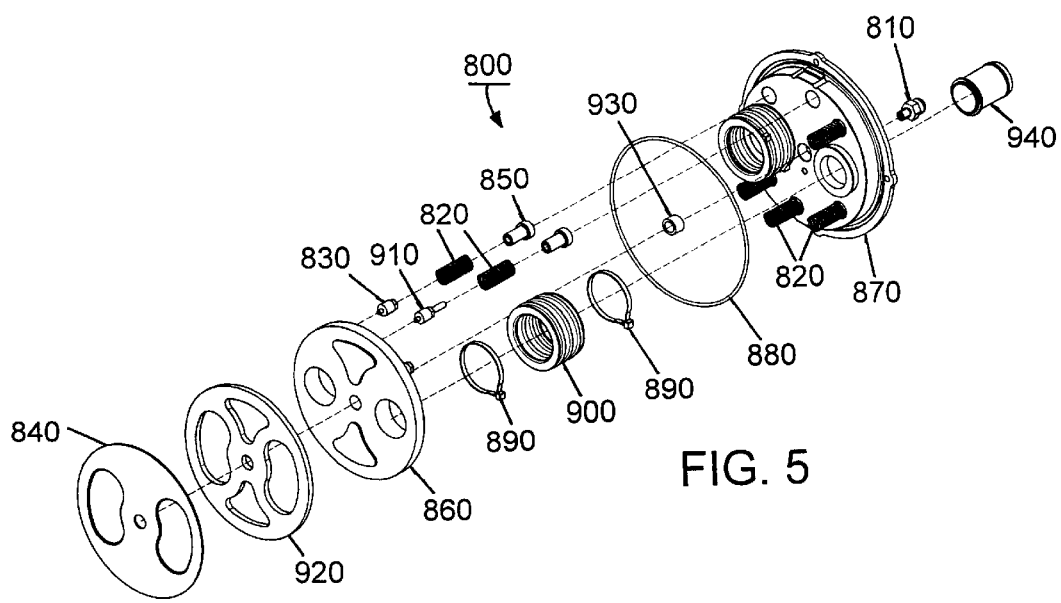
FIG. 5 is an exploded view of an enthalpy wheel subassembly.

FIGS. 4 and 5 show perspective and exploded views, respectively, of subassembly 800 which is designed to maintain a substantially constant pressure against rotor 530 during operation of enthalpy wheel 100. Subassembly 800 includes an adaptor 810, springs 820, a spring post 830, a plate 840 (e.g., a wear plate), a spring seat 850, a floating plate 860, a cap 870, an O-ring plate 880, a cable tie 890, a bellow 900 (e.g., a floating bellow), a spring post 910, a foam piece 920 (e.g., a sponge), a sleeve bearing 930, and a tube 940, an opening 950. Foam piece 920, or an equivalent compliance element, accounts for discrepancies in the flatness of floating plate 860 and plate 840. This assists in keeping a relatively constant force on rotor 530. Springs 820 account for relatively large length changes to help keep a relatively constant force on rotor 530. Typically, tube 940 is in fluid communication with tube 400, and opening 950 is in fluid communication with tube 300.

The ability of subassembly 800 to keep a relatively constant force on rotor 530 results in a relatively small change in the torque used to turn rotor 530 as the temperature of wheel 100 changes during use. For example, in some embodiments, the torque used to turn rotor 530 during use of wheel 100 increases by less than about 30 foot-pounds as the temperature of wheel 100 is increased from about 25° C. to about 70° C. (e.g., less than about 20 foot-pounds, less than about 10 foot-pounds, less than about five foot-pounds). In certain embodiments, the torque used to turn rotor 530 during use of wheel 100 (e.g., at a temperature of about 70° C.) is less than about 50 foot-pounds (e.g., less than about 40 foot-pounds, less than about 30 foot-pounds, less than about 25 foot-pounds).

Figure 6:
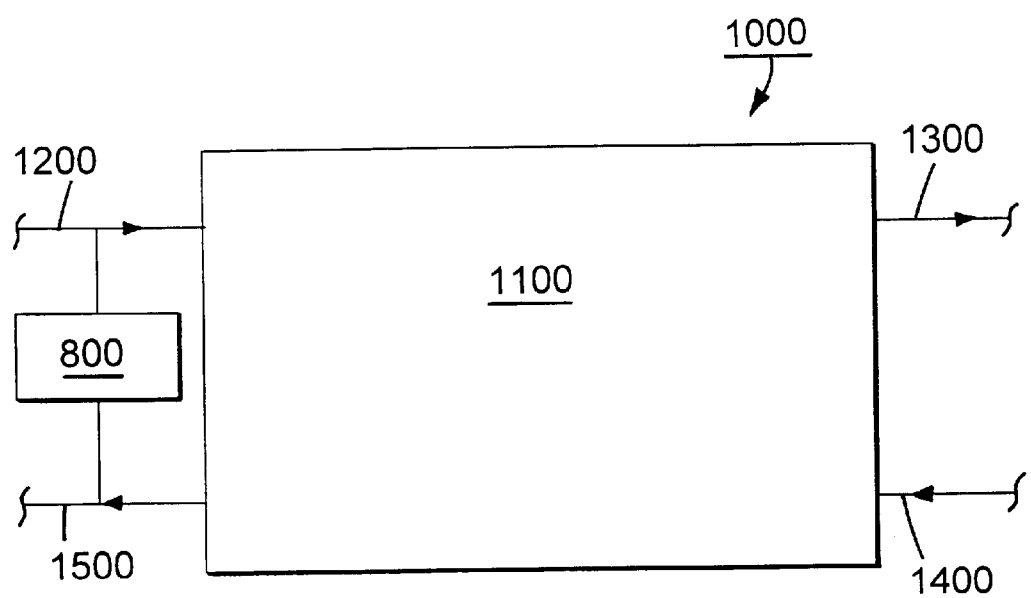
FIG. 6 shows a fuel cell system.

FIG. 6 shows a fuel cell system 1000 including a fuel cell stack 1100 containing a plurality of PEM fuel cells, a cathode gas inlet stream 1200, a cathode gas outlet stream 1300, an anode gas inlet stream 1400, an anode gas outlet stream 1500 and enthalpy wheel 800 in fluid communication with gas streams 1200 and 1500. Without wishing to be bound by any theories, in general, it is believed that enthalpy wheel 800 operates by transferring sensible heat and latent heat contained in a gas mixture present in a gas stream (e.g., gas stream 1500) to a relatively dry gas mixture present in a gas stream (e.g., gas stream 1200). Enthalpy wheel is rotationally driven and desiccant 540 is formed of a material (e.g., acrylic fiber) which is chemically inert to de-ionized water and that is coated with a material which acts as a water-selective molecular sieve, such as a zeolite. The mass of desiccant 540 transfers sensible heat from a gas mixture present one gas stream (e.g. gas stream 1500) to a gas mixture present in a different gas stream (e.g., gas stream 1200). The water-selective molecular sieve traps and transfers water, and therefore latent heat, from a gas mixture present in gas one stream (e.g., gas stream 1500) to a gas mixture present in a different gas stream (e.g., gas stream 1200). Examples of system including enthalpy wheels are disclosed in, for example, in co-pending and commonly owned U.S. patent application Ser. No. 09/389,958, filed on Sep. 3, 1999, and entitled, "Enthalpy Recovery Fuel Cell System."

Figure 7:
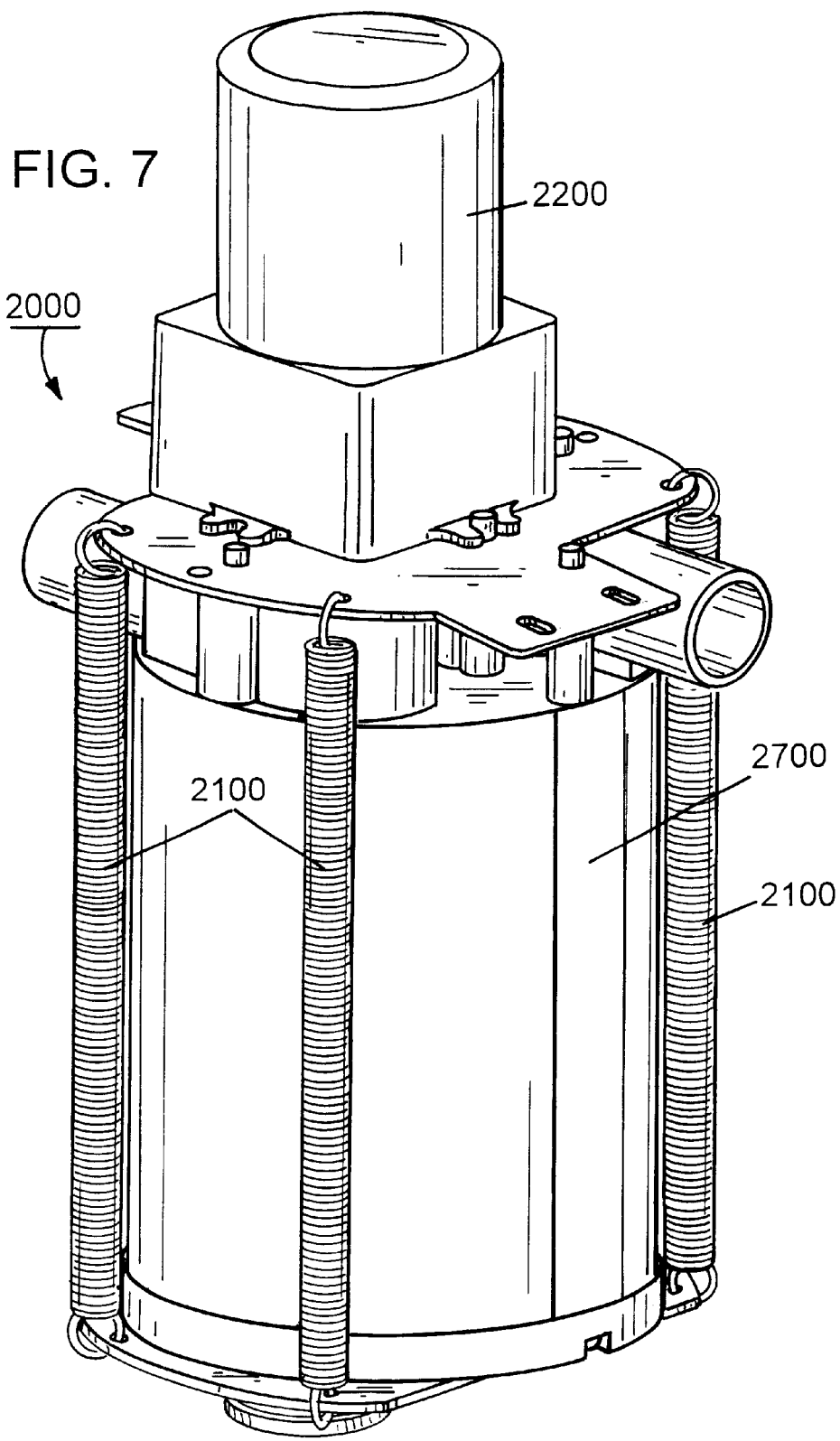
FIG. 7 shows a perspective view of an enthalpy wheel.
Figure 8:
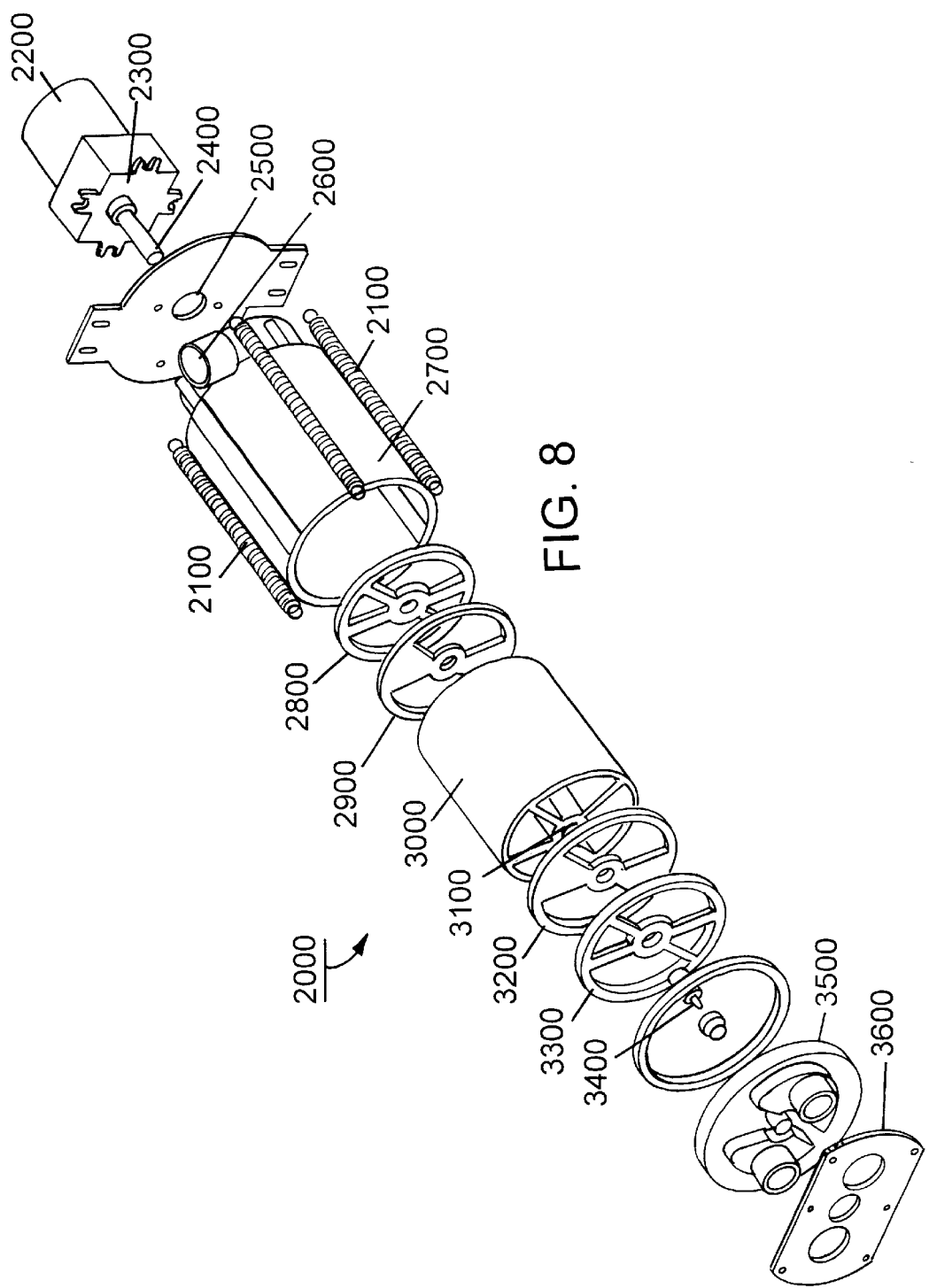
FIG. 8 shows an exploded view of an enthalpy wheel.

FIGS. 7 and 8 show perspective and exploded views of an alternate embodiment of an enthalpy wheel 2000 having springs 2100 located external to housing. Enthalpy wheel 2000 includes a motor/controller 2200, a gear reducer 2300, a drive shaft 2400, a bracket 2500, a hose barb 2600, outer housing 2700, a foam piece 2800 (e.g., a sponge), a plate 2900 (e.g., a fixed wear plate), a rotor 3000 containing desiccant 3100, a plate 3200 (e.g., a floating wear plate), a foam piece 3300 (e.g., a sponge), an idler shaft with seal 3400, an endplate 3500 (e.g., a floating endplate) and a bracket 3600 (e.g., a floating bracket). External springs 2100 and foam pieces 2800 and 3300 can assist in keeping a relatively constant pressure on rotor 3000.

While certain embodiments have been described, the invention is not limited in this sense. Other embodiments are in the claims.

What is claimed is:

1. An enthalpy wheel subassembly comprising:
   an enthalpy wheel subassembly housing having a first end and a second end;
   a plate at the first end of the enthalpy wheel subassembly;
   a cap at the second end of the enthalpy wheel subassembly;
   a compliance element between the first plate and the cap; and
   a pressure producing element between the first plate and the cap, the pressure producing element being different from the compliance element.

2. The enthalpy wheel subassembly of claim 1, wherein the compliance element comprises foam.

3. The enthalpy wheel subassembly of claim 2, wherein the pressure producing element comprising a spring.

4. The enthalpy wheel subassembly of claim 2, wherein the pressure producing element comprises a plurality of springs.

5. The enthalpy wheel subassembly of claim 1, further comprising a second plate between the first plate and the cap.

6. The enthalpy wheel subassembly of claim 5, wherein the compliance element is between the first and second plates.

7. The enthalpy wheel subassembly of claim 6, wherein the pressure producing element is between the second plate and the cap.

8. The enthalpy wheel subassembly of claim 5, wherein the pressure producing element is between the second plate and the cap.

9. An enthalpy wheel, comprising:
   an enthalpy wheel subassembly comprising:
      an enthalpy wheel subassembly housing having a first end and a second end;
      a plate at the first end of the enthalpy wheel subassembly;
      a cap at the second end of the enthalpy wheel subassembly;
      a compliance element between the first plate and the cap; and
      a pressure producing element between the first plate and the cap, the pressure producing element being different from the compliance element.

10. The enthalpy wheel of claim 9, wherein the compliance element comprises foam.

11. The enthalpy wheel of claim 10, wherein the pressure producing element comprising a spring.

12. The enthalpy wheel of claim 10, wherein the pressure producing element comprises a plurality of springs.

13. The enthalpy wheel of claim 9, further comprising a second plate between the first plate and the cap.

14. The enthalpy wheel of claim 13, wherein the compliance element is between the first and second plates.

15. The enthalpy wheel of claim 14, wherein the pressure producing element is between the second plate and the cap.

16. The enthalpy wheel of claim 13, wherein the pressure producing element is between the second plate and the cap.

* * * * *